Aug. 28, 1962     V. E. GLEASMAN     3,051,058
METHOD OF MAKING GEARS
Filed Dec. 2, 1954

INVENTOR.
VERNON E. GLEASMAN

United States Patent Office 3,051,058
Patented Aug. 28, 1962

3,051,058
METHOD OF MAKING GEARS
Vernon E. Gleasman, 3808 Kirkwood Road,
Cleveland Heights, Ohio
Filed Dec. 2, 1954, Ser. No. 472,761
4 Claims. (Cl. 90—3)

This invention relates to improvements in gears and a method of making the same.

It is frequently desirable to provide a gear having a relatively small diameter where the teeth must be large enough to withstand the thrust load placed upon them. In other words, one of the things that must be considered when selecting a gear is whether or not the teeth will stand a load to which they will be subjected. Careful consideration must be given to this factor particularly in the construction of differential gearing for automobiles. In such instances it is desirable that the gearing be as small as possible in order that it does not take up too much room. It follows that if the gearing is large the housing for the gearing must also be enlarged and the problem of road clearance for such housing becomes important, particularly with the cars having the smaller size wheels. Because of the foregoing, certain types of gearing have largely been impractical in the past.

For instance, in the formation of a differential such as shown in Patent 2,559,916 and my application Serial No. 489,373 filed February 21, 1955, now Patent 2,859,641, Nov. 11, 1958 which are known as positive drive differentials the differential gears should desirably be made of a small size since they are disposed on opposite sides of the shaft gears in order to keep the space limitations down. At the same time, the thrust imposed upon the gears dictates a minimum size pitch gear. Assuming that it is determined that a 10 pitch tooth is the minimum size which will bear the load, the prior methods indicated that a blank would have to be used of such a diameter that the space limitations were materially increased. With the above pitch it was taken for granted that less than 12 teeth could not be used even though the teeth were cut in the formation of the so-called stub-tooth gears. It becomes apparent, therefore, that if a 10 pitch tooth can be made on a smaller blank the resultant overall diameter is smaller and the space limitations are reduced. However, even with the formation of stub-teeth it was previously found that an attempt to provide the gear with less than 12 teeth resulted in severe undercutting which reduced the strength of the teeth to such an extent that they would not withstand the thrust load.

By my present invention I am able to cut blanks to provide a considerably less number of teeth without undercutting, and where the teeth are sufficiently large, to withstand the thrust placed upon them.

I will explain the invention with reference to the accompanying drawing which illustrates one practical embodiment thereof to enable others familiar with the art to adopt and use the same, and will summarize in the claims the novel features of construction and novel combinations of parts for which protection is desired.

Figure 3:
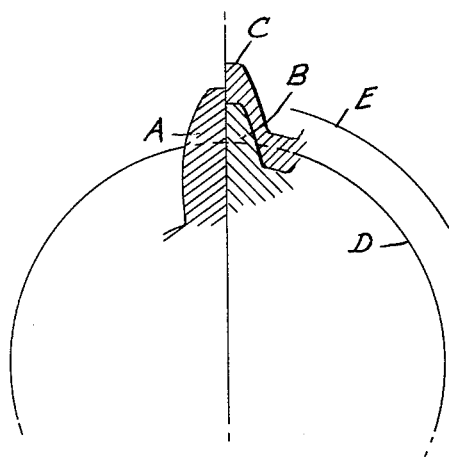

FIG. 3 is a composite section showing cross-section through a shaft provided with a tooth generated according to the conventional formula; the section of the tooth generated according to Fellows formula; and a section through a tooth generated according to my formula; also indicating the pitch circle of a tooth according to my formula and the common pitch circle according to Fellows and conventional formulas.

Figure 1:
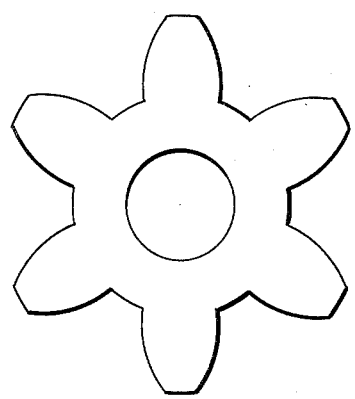
FIG. 1 is a plan of a 6/8 pitch gear which is cut to my formula.
Figure 2:
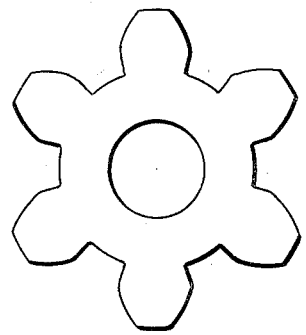
FIG. 2 is a plan view of a 6/8 pitch cut to Fellows formula.

As shown in FIG. 1, the 6/8 pitch gear is generated according to my formula; while in FIG. 2 the 6/8 pitch gear is generated according to the Fellows formula, which formula according to the accepted handbooks provides for a minimum undercut. The gears shown in FIGS. 1 and 2 were generated with the same hob (6/8 pitch) on the same machine and their outlines were traced from actual gears cut with this same hob. In FIG. 3 the section indicated by the line A was generated according to a conventional formula, while the gear indicated at B was generated according to the Fellows formula. The action of gear C, however, was generated according to my formula. It will be noted in FIG. 3 that the pitch circles D according to the Fellows and conventional methods coincide or are the same while the pitch circle E of the gear teeth generated according to my formula are of larger size, this figure clearly showing that the pitch circles for the gear teeth generated according to the conventional pitch circle is the same as that generated according to the Fellows method, whereas the pitch circle E of the tooth generated by my method has an increased pitch diameter over the pitch circles generated by the conventional and Fellows gear, thus obviating undercutting of the gear, as hereinafter explained.

In describing the method I will refer to an example of a differential gear that might be used in a differential, as disclosed in the aforesaid application, wherein six teeth having a 42° helix angle are provided, the teeth being 10 pitch teeth and wherein they retain their full strength and no undercutting is present.

Briefly, my invention comprises cutting a gear with a combination of two pitches, one of which is smaller than the other, upon a blank which is increased in size by the difference in the working depth of the two pitches. As a specific example I use a 10-12 pitch tooth and increase the diameter by the difference of the working depth of the two pitches. A 10 pitch gear, therefore, is cut to the depth of a 12 pitch tooth. In determining the diameter of the blank for a six tooth gear it is found that a 10 pitch diameter blank must have an O.D. of 1.0074. The tooth working depth for this gear is .200 inch. The tooth working depth for a 12 pitch gear is .166 inch. By increasing the diameter of the above blank the difference between these two working depths of .034 inch, provides a blank having a diameter of 1.0414.

Having determined the size of the blank it then remains to cut the blank by the use of a 10/12 pitch hob. This enables me to cut a six tooth gear on a smaller blank without undercutting where heretofore such a gear was thought to be impossible of construction.

Thus, I am able to provide a gear having teeth of the desired strength in a small space limitation.

Having thus described my invention I am aware that numerous and extensive departures may be made therefrom without departing from the spirit or scope of the invention as defined in the appended claims.

I claim:

1. In a method of forming a gear of less than twelve teeth to provide an increased pitch diameter tooth for sustaining a predetermined load, comprising the steps of forming the teeth of one standard pitch to the size of the teeth of said one pitch and cutting same to the depth of the teeth of a smaller pitch; and increasing the size of the blank over a conventional larger pitch blank an amount substantially equal to the difference in the working depth of the two pitches of said teeth.

2. In a method of forming a gear of less than twelve teeth to provide an increased pitch diameter tooth for sustaining a predetermined load, comprising forming the teeth to the contour of a ten-pitch gear having the depth of the teeth of a twelve-pitch gear, and increasing the diameter of the blank over the conventional ten-pitch gear blank by a distance equal to the difference between the working depth of the ten and twelve pitch teeth.

3. In a method of forming a gear of less than twelve teeth having an increased pitch diameter tooth for sustaining a predetermined load, comprising the step of forming the gear with a conventional first pitch tooth to the depth of a smaller pitch tooth, and increasing the pitch diameter and the outside diameter of the blank over the conventional in size by substantially the difference in working depth of the two pitches.

4. In a method of forming a gear having an increased pitch diameter for sustaining a predetermined load, comprising the step of forming the same with a conventional first pitch tooth to the depth of a smaller pitch tooth, and increasing the pitch diameter and the outside diameter of the blank from the conventional in size by substantially the difference in working depth of the two pitches.

References Cited in the file of this patent

UNITED STATES PATENTS

| | | |
|---|---|---|
| 2,308,558 | Wildhaber | Jan. 19, 1943 |
| 2,422,326 | Wildhaber | June 17, 1947 |
| 2,436,276 | Wildhaber | Feb. 17, 1948 |
| 2,447,104 | Trbojevich | Aug. 17, 1948 |

OTHER REFERENCES

"The Stub-Tooth Gear," 2nd Edition (1912) The Fellows Gear Shaper Co., pages 14–16.

"The Involute Gear," Fifth Edition 1939, The Fellows Gear Shaper Co., pages 19 to 22.